Oct. 3, 1933.  R. I. REID  1,928,795
ANTIFRICTION LEAK PREVENTING MEANS FOR PUMPS AND MOTOR PUMPS
Filed Oct. 7, 1931
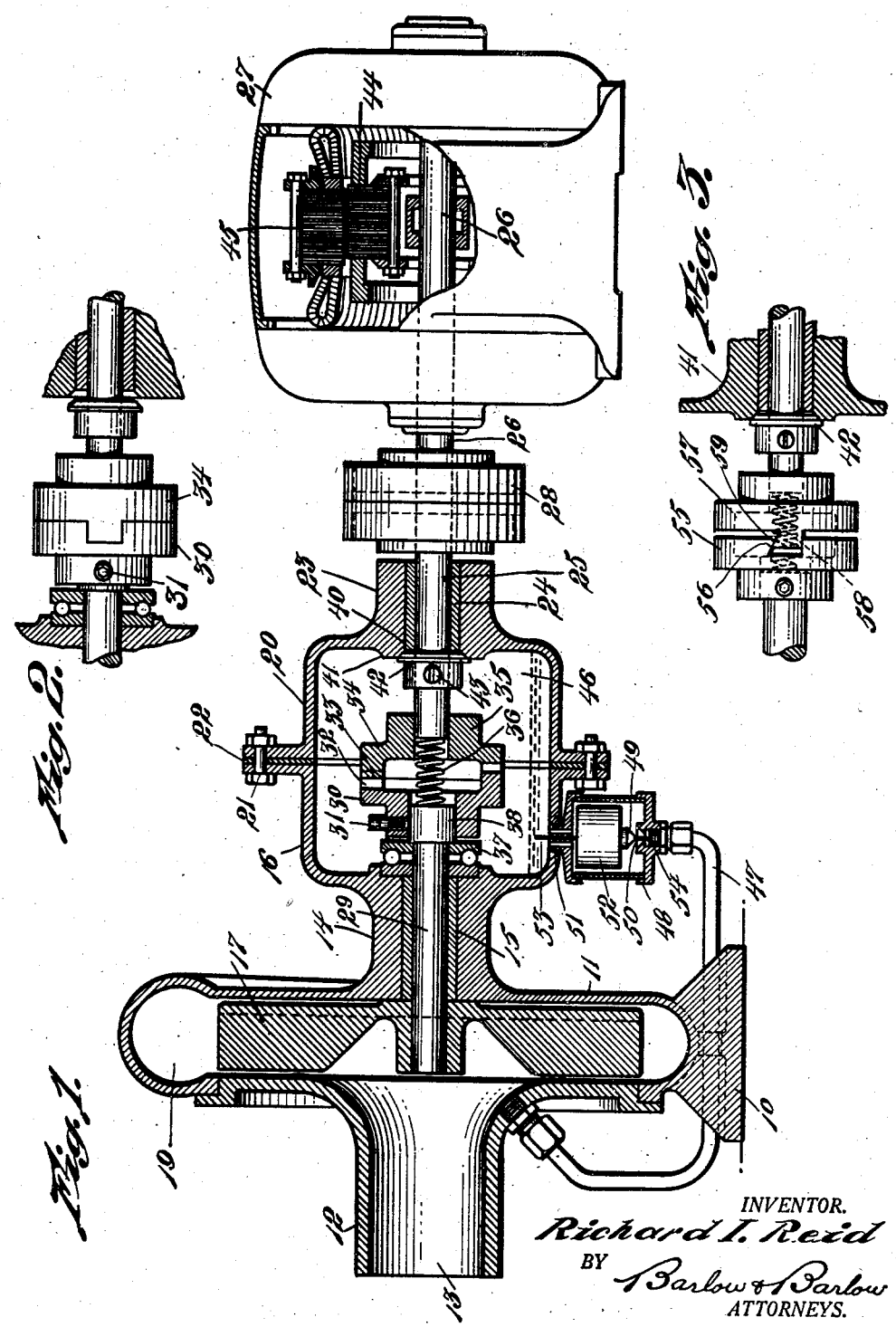
INVENTOR.
Richard I. Reid
BY Barlow & Barlow
ATTORNEYS.

Patented Oct. 3, 1933

1,928,795

UNITED STATES PATENT OFFICE 1,928,795

ANTIFRICTION LEAK-PREVENTING MEANS FOR PUMPS AND MOTOR-PUMPS

Richard I. Reid, Providence, R. I.

Application October 7, 1931. Serial No. 567,407

7 Claims. (Cl. 286—7)

This invention relates to a fluid pump and a motor drive therefor, and has for its object to provide a construction for sealing the motor against leakage with the minimum amount of friction on the drive shaft.

Another object of this invention is the provision of a construction to prevent the escape of the fluid operated upon without causing friction such as is usual in the common stuffing box for this purpose.

Another object of the invention is the provision of means which will return the liquid which has escaped from the pump about the shaft thereof to the entrance opening to the pump that the liquid will not be lost and that an untidy appearance caused by leakage from the pump will be avoided.

Another object of this invention is the provision of a construction which will prevent the scoring of the drive shaft or the like, and other disadvantages attendant to the stuffing box type of means for preventing leakage of the liquid operated upon.

A further object of this invention is the provision of a chamber for catching any liquid escaped about the driven shaft and sealing this chamber to prevent escaping of the liquid about the drive shaft which enters the chamber, which seal will be broken upon the start or rotation of the shafts to prevent friction.

A still further object of this invention is the provision of means to close the return conduit from the chamber to the entrance opening to the pump when the liquid level falls below a predetermined point that air will not be sucked into the motor or pump.

With these and other objects in view, the invention consists of certain novel features of construction, as will be more fully described, and particularly pointed out in the appended claims.

In the accompanying drawing:

Fig. 1 is a sectional view through the pump and showing the electric motor for driving the pump with parts broken away for showing the relation of the armature and field.

Fig. 2 is an enlarged elevation partly in section, showing the coupling for the drive and driven shafts.

Fig. 3 is a side elevation of a clutch which may be used in this construction.

It is known in the use of motors for driving pumps or the like that a stuffing box is required to prevent leakage of the liquid operated upon about the shafts and through the bearing therefor, and that such stuffing box to properly function must be frequently attended and tightened up to cause the packing to friction against the shaft, thus materially detracting from the efficiency of the motor with which it is connected, and in order to avoid this constant attention to the stuffing box and eliminate the friction attendant thereto on the shaft and provide a greater efficiency I have provided a chamber to collect any liquid escaping through the shaft bearing and about the shaft and have connected this chamber to the entrance end of the pump that the escaped liquid will be returned to the pump, and in order that the entrance of the drive shaft into the chamber may be sealed I have provided a valve seat and mounted a valve on the drive shaft to seal this opening when the shaft is not working, and I have additionally provided means to lift this valve from its seat so that there will be no friction of this seal to lessen the efficiency of the rotating parts; and the following is a detailed description of the present embodiment of this invention, illustrating the preferred means by which these advantageous results may be accomplished.

I have illustrated in the drawing a centrifugal pump, although it will be understood that any shaft partly running in a liquid and partly dry or fluid motors or pumps used in any stage may utilize the invention herein disclosed.

With reference to the drawing, 10 designates the base of the centrifugal pump which is provided with a casing extended on one side as at 12 to provide an entrance or inlet opening 13 to the casing, while the casing is extended on its opposite side as at 14 to provide a convenient bearing which is bushed as at 15 and is then enlarged into a bell shape as at 16 providing a part of the fluid chamber hereinafter described.

A driven shaft 29 is mounted in the bearing 15 and an impeller 17 is fixed on the shaft and located in the casing 11 to receive about its center the liquid and force it outwardly by means of the vanes thereon to discharge, adjacent the peripheral portion 19 of the casing in the usual manner of a centrifugal pump. The bell shape portion 16 of the casing is completed by a similarly formed complemental section 20, and both sections are bolted together by means of a bolt 21, with a packing between the flanges to form a liquid tight joint and a liquid receiving chamber.

The end portion 23 of this housing is provided with a bearing 24 in which there is mounted a drive shaft 25 which is coupled to the drive shaft 26 of a specially constructed electric motor 27 by means of a suitable coupling 28. The drive shaft 25 is coupled to the driven shaft 29 by means of a disc 30 secured to the shaft 29 by a set screw 31 and which is provided with a groove 32 to receive the projection 33 on the disc 34, which is secured to the drive shaft 25 by means of its hub 35. Thus the two discs 30 and 34 permit of endwise movement of the drive shaft, while the shafts are forced apart by means of a spring 36 between the ends of the shafts. A thrust bearing 37 is provided to prevent endwise movement of the shaft 29 which engages the hub 38 of this shaft 29.

The opening 40 for the drive shaft is provided with a valve seat 41 about its edge with which a valve 42 mounted on the shaft 25 engages, the valve being secured to the shaft by a set screw 43 and thus endwise movement of the shaft 25 will move the valve from its seat.

The electric motor 27 is of special construction. Its armature 44 secured to the shaft 26 is offset with relation to the center of the magnetic field 45 of the motor so that upon initial rotation of the armature relative to its field the armature will move the shaft 26 longitudinally to center this armature winding and the field, thus this movement will lift the valve 42 from its seat. When the motor stops running the magnetic action ceases and the spring 36 will force the valve to its seated position, sealing the opening 40 and preventing any liquid which might leak into the chamber 46 from escaping about the drive shaft extending therefrom.

In order to remove the liquid which escapes into the chamber 46 I have connected this chamber by means of a conduit 47 to the inlet opening 13 of the pump, in a manner such that entering liquid will suck in the liquid in the chamber, and I control the passage of liquid through this conduit by means of a float chamber 48 having a valve 49 therein to engage the valve seat 50. The valve is controlled by a float 52, guided by means of a pin 53 at its upper end and 54 at its lower end in suitable guide openings, and about these openings there are fluid openings 51 for the admission of fluid to the chamber. When the liquid is exhausted from the chamber the valve will close and prevent air from being sucked into the entrance end of the pump.

In some instances it is desirable to provide a mechanical means for lifting the valve 42 from its valve seat 41 instead of depending upon the balance of the spring 36, and the strength and position of the magnetic field and armature of the motor, and in such instances I may provide a coupling consisting of a disc 55 provided with an undercut surface 56 and with a complemental disc 57 provided with a projection 58 having a corresponding inclined surface 59 so that upon initial turning of the disc 57 it will be drawn in along the incline 56 and 59 to axially move the drive shaft and lift the valve 42 from its valve seat 41.

I have described this invention in connection with a drive motor and fluid pump but it is understood that it is adapted to be used to seal any rotating shaft against the escape of liquid along or from about the same.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination, a driven shaft, a drive shaft, means for coupling said shafts together to permit endwise movement of the drive shaft, a housing providing a chamber containing said coupling means, an opening through said housing, a bearing in said opening for said drive shaft, a valve seat about the said opening and a valve mounted on said drive shaft to engage said seat to form a tight joint, and means for moving said drive shaft endwise upon rotation thereof to lift the valve from its seat.

2. In combination, a bearing, a driven shaft extending thru said bearing and fixed against longitudinal movement, a housing having a chamber surrounding one end of said shaft, a drive shaft extending outwardly from said chamber, means for coupling said shafts together to permit of endwise movement of the drive shaft, a valve seat about the opening thru which said drive shaft extends, a valve on said shaft to engage said valve seat, and means for positively and instantly lifting the valve from said seat upon rotation of said drive shaft.

3. In combination, a driven shaft, a drive shaft, means for coupling said shafts together to permit endwise movement of one of said shafts, a housing having a chamber containing said coupling means, said housing having an opening provided with a valve seat, a bearing in said opening for one of said shafts, a valve secured to one of said shafts to engage said seat to form a tight joint, and means for moving the shaft having the valve thereon endwise upon rotation thereof to lift the valve from its seat.

4. In combination, a casing, a bearing through said casing, a driven shaft in said bearing, a drive shaft, a housing adjacent said casing having a chamber for collecting liquid escaping between the shaft and bearing, said housing having an opening provided with a valve seat, a bearing in said opening for the drive shaft, means for coupling said shafts, a valve secured to said drive shaft to engage said seat to form a tight joint, means for moving said drive shaft endwise upon rotation thereof to lift the valve from its seat and means including a pump for removing the escaped liquid from the chamber to the casing.

5. In combination, a housing having a chamber, a bearing in said housing, a driven shaft extending through said bearing and fixed against longitudinal movement, said chamber surrounding one end of said shaft, a drive shaft extending outwardly from said chamber, means for connecting said shafts to permit endwise movement of the drive shaft, a valve seat about the opening through which said drive shaft extends, a valve on said shaft to engage said valve seat, means for lifting the valve from said seat upon rotation of said drive shaft, and means acting on the end of said drive shaft for returning the valve into engagement with the valve seat when the shaft is inoperative.

6. In combination, a shaft, a housing having a chamber therein surrounding one end of said shaft, a bearing in said housing through which portion of said shaft is journaled, a valve seat about said bearing and a valve mounted on said shaft to engage said seat to form a tight joint, an electric motor to rotate said shaft having an armature offset with relation to the center of the magnetic field so that said valve will lift from its seat upon energizing of the motor and means for returning the valve to its sealing position when the motor is inoperative.

7. In combination, a housing having a chamber for collecting liquid, an electric motor having an armature offset with relation to the center of the magnetic field, a shaft for said motor extending into said chamber, a bearing in said housing for said shaft, a valve seat about said bearing, a valve mounted on said shaft to engage said seat to form a tight joint to prevent liquid escaping through said bearing, said valve being lifted from said seat upon energizing of the motor, and means for returning said valve to said seat when the motor is inoperative.

RICHARD I. REID.